United States Patent
Kobayashi et al.

(10) Patent No.: US 6,310,711 B1
(45) Date of Patent: Oct. 30, 2001

(54) OPTICAL DEFECTION DEVICE, STOP CONTROL METHOD THEREOF, AND IMAGE FORMING APPARATUS THEREWITH

(75) Inventors: Hiroshi Kobayashi; Takaaki Kurosawa, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/443,880

(22) Filed: Nov. 19, 1999

(30) Foreign Application Priority Data

Feb. 24, 1999 (JP) .................................................. 11-046477

(51) Int. Cl.[7] .................................................. G02B 26/08
(52) U.S. Cl. ........................ 359/216; 359/198; 359/200; 347/261
(58) Field of Search ..................................... 359/198, 200, 359/216–219; 347/260, 261; 310/90.5

(56) References Cited

U.S. PATENT DOCUMENTS 5,835,124 * 11/1998 Fukita et al. ........................ 347/260

* cited by examiner

Primary Examiner—James Phan
(74) Attorney, Agent, or Firm—Frishauf, Holtz, Goodman, Langer & Chick, P.C.

(57) ABSTRACT

An optical deflection device includes: a fixed supporting member; a coil supporting member fixed on the fixed supporting member; a coil fixed on the coil supporting member; a rotary body having a rotary polygon mirror, a magnet facing and apart from the coil and a rotary supporting member for supporting the rotary polygon mirror and the magnet; a bearing unit supported on the fixed supporting member for rotatably supporting the rotary body; and a buffer member interposed between the fixed supporting member and the coil supporting member.

6 Claims, 11 Drawing Sheets

PRIOR ART

OPTICAL DEFECTION DEVICE, STOP CONTROL METHOD THEREOF, AND IMAGE FORMING APPARATUS THEREWITH

BACKGROUND OF THE INVENTION

The present invention relates to an optical deflection device which forms a scanning beam in an optical scanning unit which conducts scanning with a laser beam. The optical deflection device of the invention is used for a copying machine, a facsimile machine, a printer and a scanner, while, an image forming apparatus related to the invention is used for a copying machine, a facsimile machine, and a printer.

As a conventional optical scanning unit, those wherein a scanning laser beam is formed by rotating a rotary polygon mirror at high speed. As a motor which drives the rotary polygon mirror, those having a rotary body supported by ball bearings and those having a rotary body supported by dynamic pressure bearing devices each being called an air bearing, are available. The latter is attracting public attention as a powerful means to realize high speed copying machines and high speed printers, because it has efficiency to rotate at superhigh speed such as tens of thousands rpm.

Since the rotary polygon mirror rotates at high speed in optical scanning of a laser beam, there is a problem of noise caused by rotation at high speed. In the conventional optical deflection device, it has been found that a vibration is caused between a coil supporting member and a supporting base board when a rotary body is rotated, because the coil supporting member which supports a coil that rotates a rotary body has been fixed directly on the supporting base board with a fixing means such as a screw, and thereby a noise called an electromagnetic force noise is caused. Experiments have shown that the greater cause of the noise is the electromagnetic force noise, though a mirror surface causes a noise when it rotates through the air in the course of rotation of the rotary polygon mirror.

Figure 12:
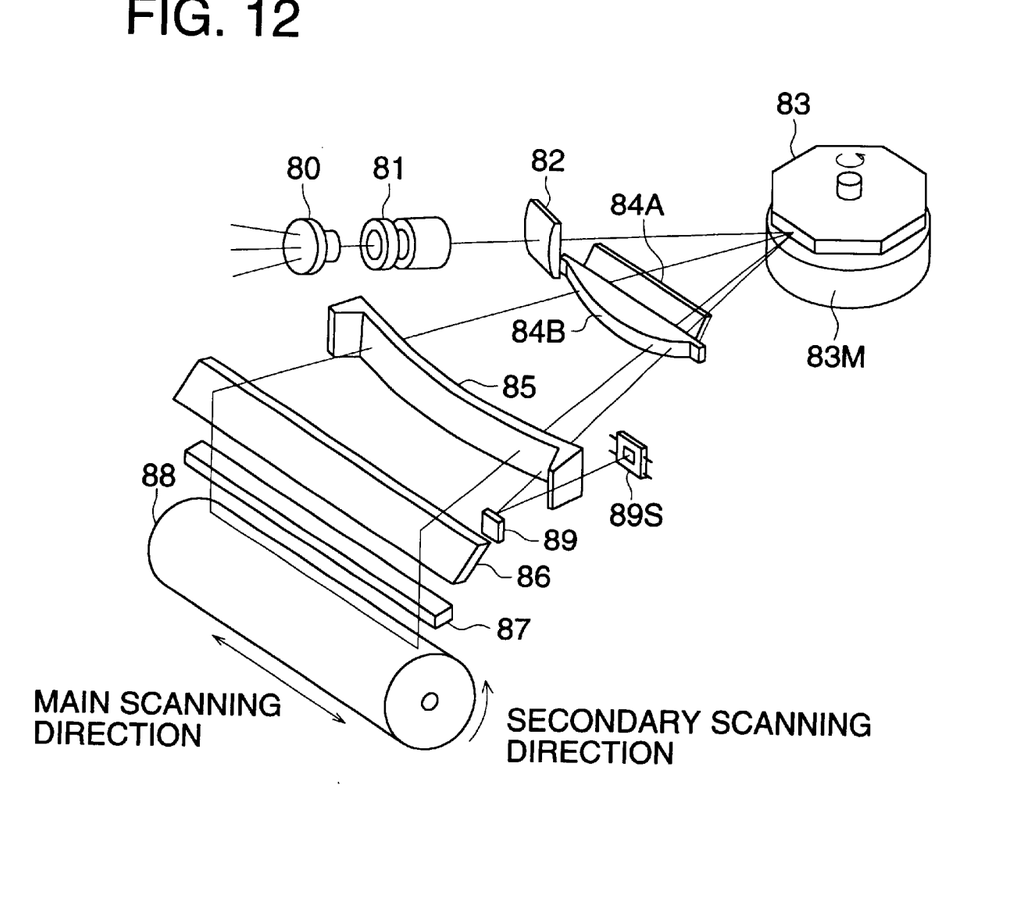
FIG. 12 is a perspective view of a beam scanning optical apparatus.

In an image recording apparatus such as a laser printer, a laser beam is caused to enter a polygon mirror of an optical deflection device rotating at high speed based on information obtained through reading as a writing means for images, then, the reflected light conducts scanning to be projected on the surface of a photoreceptor for image recording. FIG. 12 is a perspective view showing an embodiment of a beam scanning optical apparatus employing an optical deflection device composed of a polygon mirror.

In the drawing, the numeral 80 represents a semiconductor laser, 81 represents a collimator lens representing a beam forming optical system, 82 represents a first cylindrical lens, 83 is a polygon mirror, each of 84A and 84B is an fθ lens, 85 is a second cylindrical lens, 86 is a mirror, 87 is a cover glass, and 88 is a photoreceptor drum. Incidentally, the numeral 89 is an index mirror for detecting synchronization, 89S is an index sensor for sensing synchronization, and 83M is a rotation driving section for polygon mirror 83 of an optical deflection device.

A beam emitted from the semiconductor laser 80 is changed to a collimated light by the collimator lens 81, then, passes through the first cylindrical lens 82 of a first image forming optical system, and enters a mirror surface of the polygon mirror 83 which is rotating at high speed in uniform velocity. Then, the light reflected on the mirror surface is transmitted through a second image forming system composed of fθ lenses 84A, 84B, and the second cylindrical lens 85, and goes through mirror 86 and cover glass 87 to conduct (main) scanning on the circumferential surface of photoreceptor drum 88 with the prescribed spot diameter. Fine adjustment of the direction of the main scanning is made by an unillustrated adjusting mechanism, and detection of synchronization for each line is conducted by making a beam before the start of scanning to enter the index sensor 89S through the index mirror 89.

It is necessary, for obtaining an excellent latent image on photoreceptor drum 88 by the above-mentioned beam scanning optical unit, that a polygon mirror which rotates at high speed is made to be a polygon mirror forming a precise regular polygon, and it is free from eccentricity and inclination to the rotation axis, and it rotates without positional deviation in the axial direction.

A rotary mirror unit is provided thereon with a polygon mirror and a torque-generating permanent magnet which faces a coil provided on a printed board on the fixed base board, and it is arranged to rotate at high speed between an outer casing bearing of the mirror unit and a fixed inner cylinder bearing.

In the structure of a mirror unit which rotates on an optical deflection device, a cylinder portion of a flange having a disk portion which serves as a reference plane when a polygon mirror is mounted is put together solidly through the means of shrinkage fitting of an outer casing bearing, and the polygon mirror is sandwiched between a disk portion of a flange and a mirror holding plate on which a permanent magnet is fixed.

It was observed by the inventors of the invention that a cylindrical outer casing bearing of a mirror unit and a flange fitted with the outer casing bearing are in the relationship of stress, and the outer casing bearing is strained by fluctuations of ambient temperature to be in a tapered conical shape. When the outer casing bearing is strained, efficiency of the mirror unit which rotates on an inner cylinder bearing through an air bearing turns out to be unstable.

As a method to unite the cylinder portion of the flange solidly with the outer casing bearing, there also is a method, for example, to inject and fix an adhesive agent in a joining section between the outer casing bearing and the cylinder portion. In this method, however, it is necessary that adhesive agents are filled and hardened in the clearance which is uniform in terms of a gap for the entire section in the radial direction between the outer casing bearing and the cylinder portion. However, the greatest possible care is required to attain the state of joining, while satisfying the conditions stated above.

When joining the outer casing bearing and the cylinder portion with a means other than an adhesive agent, there exists an interacting stress between the outer casing bearing and the cylinder portion, and the relationship of the stress varies depending on fluctuations of ambient temperature, thus, the state of generated strain sometimes causes a possibility of relative deviation in the axial direction between the outer casing bearing and the cylinder portion.

SUMMARY OF THE INVENTION

Accordingly, the first object of the invention is prevent that noises are generated when a rotary polygon mirror is driven to rotate.

The second object of the invention is to provide a highly reliable optical deflection device wherein uneven strains are not generated on the outer casing bearing in spite of fluctuations of ambient temperature and the passage of time, and stable rotation at high speed can be continued.

The third object of the invention is to provide a reliable optical deflection device wherein a flange is fitted with an outer casing bearing without occurrence of inclined angle, and high speed rotation which is free from surface inclination of a polygon mirror surface and eccentricity, is made possible.

The fourth object of the invention is to provide an optical deflection device wherein a reliability is improved, no inclination of a flange to an outer casing bearing is caused, occurrence of deviation in the axial direction is prevented, and high speed rotation is made possible.

The first object of the invention mentioned above is attained by either one of the following structures.

(1)

An optical deflection device having therein a fixedly-supporting member, a coil supporting member supported fixedly on the fixedly-supporting member, a coil supported fixedly on the coil supporting member, a rotary body having thereon a rotary polygon mirror, a magnet facing the coil, a rotary supporting member which supports the rotary polygon mirror and the magnet, and a bearing unit which is supported by the fixedly-supporting member and supports rotatably the rotary body, wherein a buffer member lies between the fixedly-supporting member and the coil supporting member.

(2)

An image forming apparatus which is provided with an optical deflection device having therein a rotary body which has a rotary polygon mirror, a magnet, and a rotary supporting member which fixedly supports the rotary polygon mirror and the magnet, a coil fixed on the stationary portion, a driving circuit which supplies to the coil the driving current for providing torque to the rotary body, and a control means which outputs rotation signals and brake signals to the driving circuit, wherein a buffer member lies between the fixedly-supporting member and the coil supporting member.

The second object of the invention mentioned above is attained by either one of the following structures.

(1) An optical deflection device in which a mirror unit having an outer casing bearing rotates on an inner cylinder bearing, wherein the mirror unit is composed of a flange member, a polygon mirror, an elastic member and a mirror holding plate, the flange member is composed of a cylinder portion and a disk portion provided on the end of the cylinder portion, the cylinder portion is united with an outer circumferential surface of the outer casing bearing, the disk portion is provided with a reference plane for mounting a mirror, the polygon mirror is sandwiched between the disk portion and the mirror holding plate through the elastic member, and the wall thickness of the cylinder portion at the joining portion to join with the outer casing bearing is uniform.

(2) An optical deflection device in which a mirror unit having an outer casing bearing rotates on an inner cylinder bearing, wherein the mirror unit is composed of a flange member, a polygon mirror, an elastic member and a mirror holding plate, the flange member is composed of a cylinder portion and a disk portion provided on the end of the cylinder portion, the cylinder portion is united with an outer circumferential surface of the outer casing bearing, the disk portion is provided with a reference plane for mounting a mirror, the polygon mirror is sandwiched between the disk portion and the mirror holding plate through the elastic member, and the reference plane for mounting a mirror on the disk portion is located outside a range of joining between the cylinder portion and the outer casing bearing in the direction of rotation axis.

(3) An optical deflection device in which a mirror unit having an outer casing bearing rotates on an inner cylinder bearing, wherein the mirror unit is composed of a flange member, a polygon mirror, an elastic member and a mirror holding plate, the flange member is composed of a cylinder portion and a disk portion provided on the end of the cylinder portion, the cylinder portion is united with an outer circumferential surface of the outer casing bearing, the disk portion is provided with a reference plane for mounting a mirror, the polygon mirror is sandwiched between the disk portion and the mirror holding plate through the elastic member, and a ring-shaped groove is provided on the side of the reference plane for mounting a mirror between the cylinder portion and the disk portion and a bottom surface of the groove is located outside a range of joining between the cylinder portion and the outer casing bearing in the direction of rotation axis.

The third object stated above is attained by an optical deflection device in which a mirror unit having an outer casing bearing rotates on an inner cylinder bearing, wherein the mirror unit is composed of a flange member, a polygon mirror, an elastic member and a mirror holding plate, the flange member is composed of a cylinder portion and a disk portion provided on the end of the cylinder portion, the cylinder portion is united with an outer circumferential surface of the outer casing bearing, the disk portion is provided with a reference plane for mounting a mirror, the polygon mirror is sandwiched between the disk portion and the mirror holding plate through the elastic member, and the cylinder portion and the outer casing bearing are joined in the state of force fitting.

The fourth object stated above is attained by an optical deflection device in which a mirror unit having an outer casing bearing rotates on an inner cylinder bearing, wherein the mirror unit is composed of a flange member, a polygon mirror, an elastic member and a mirror holding plate, the flange member is composed of a cylinder portion and a disk portion provided on the end of the cylinder portion, the cylinder portion is united with an outer circumferential surface of the outer casing bearing, the disk portion is provided with a reference plane for mounting a mirror, the polygon mirror is sandwiched between the disk portion and the mirror holding plate through the elastic member, and the cylinder portion and the outer casing bearing are in the state of force fitting, and adhesive agents are coated on the end portion for joining, or by an optical deflection device in which a mirror unit having an outer casing bearing rotates on an inner cylinder bearing, wherein the mirror unit is composed of a flange member, a polygon mirror, an elastic member and a mirror holding plate, the flange member is composed of a cylinder portion and a disk portion provided on the end of the cylinder portion, the cylinder portion is united with an outer circumferential surface of the outer casing bearing, the disk portion is provided with a reference plane for mounting a mirror, the polygon mirror is sandwiched between the disk portion and the mirror holding plate through the elastic member, a groove portion is provided on the joining section of the cylinder portion or of the outer casing bearing, the cylinder portion and the outer casing bearing are in the state of force fitting, and adhesive agents are injected in the groove portion for joining.

DETAILED DESCRIPTION OF THE PREFERRED EMBODIMENT

Embodiments 1–3 for attaining the first object will be explained in detail as follows, referring to FIGS. 1–6.

(1) Embodiment 1

Figure 1:
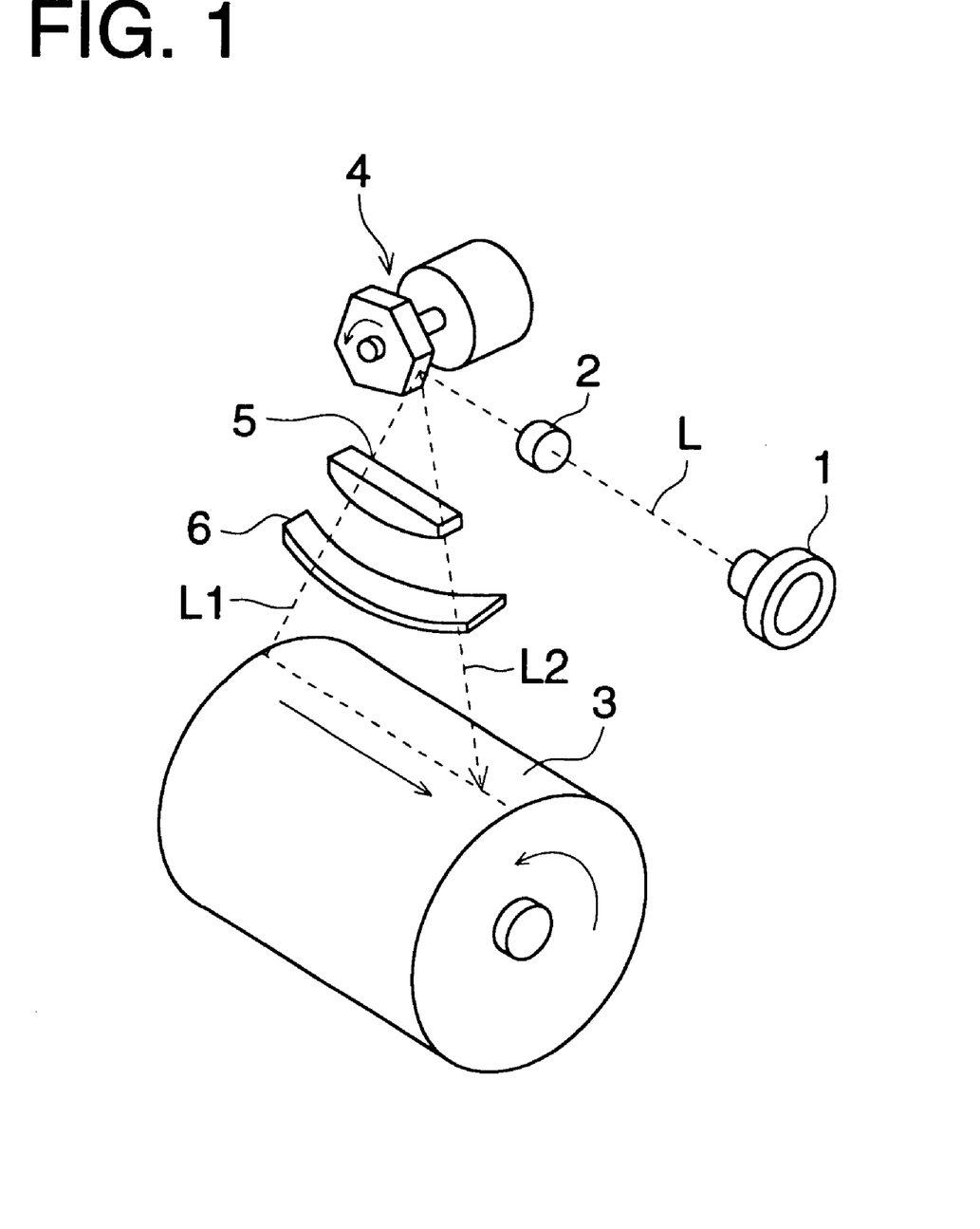
FIG. 1 is a diagram showing a laser scanning optical system.

FIG. 1 shows a laser scanning optical system to which Embodiment 1 of the invention is applied.

Laser beam L emitted from semiconductor laser 1 passes through collimator lens 2 and then is deflected by optical deflection device 4 to be a scanning beam which oscillates within a range of a direction shown with L1 and L2. Laser beam L deflected by the optical deflection device 4 is transmitted through fθ lens 5 and cylindrical lens 6 and is projected on the surface of photoreceptor 3.

Figure 2:
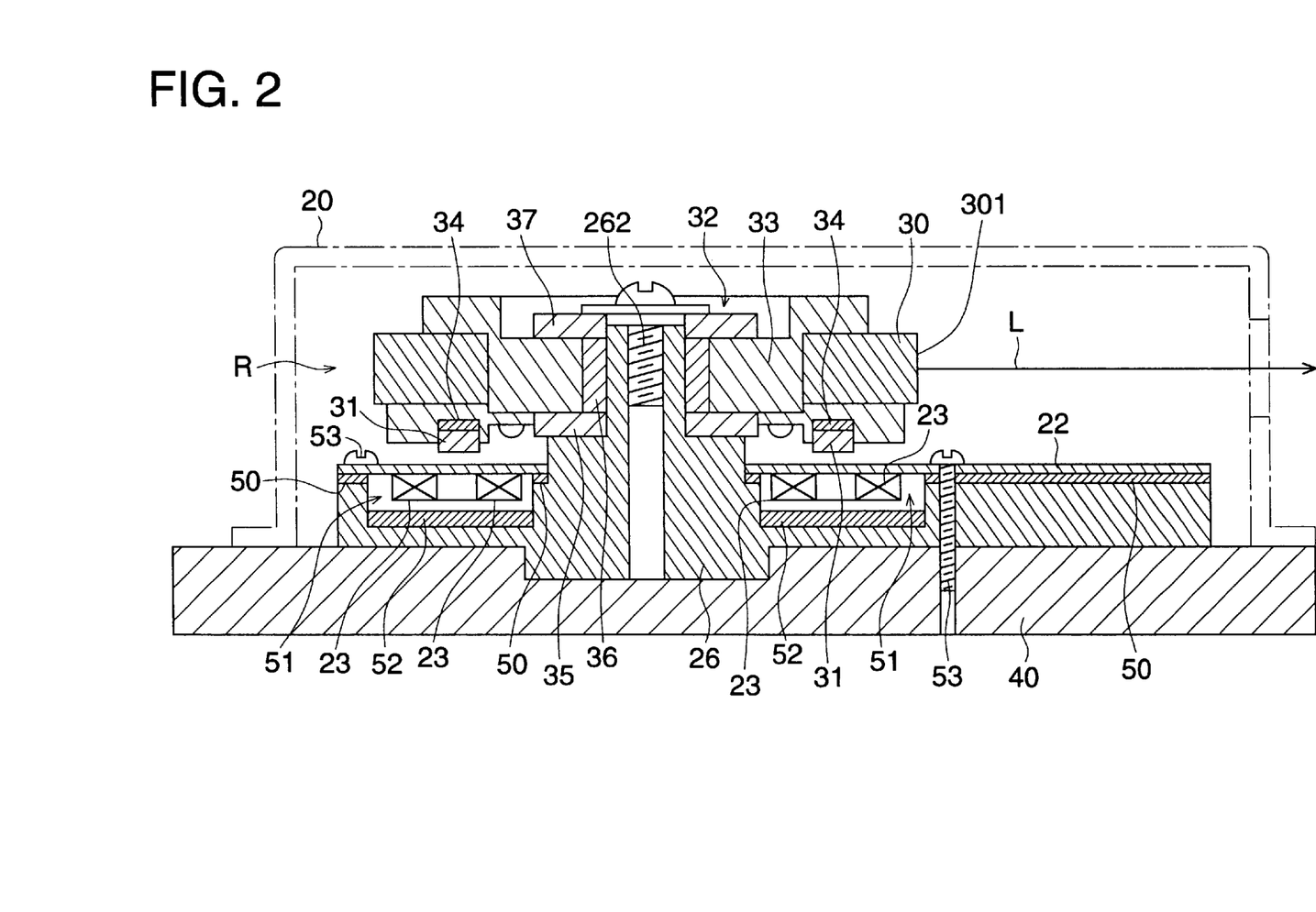
FIG. 2 is a sectional view of an optical deflection device related to the first embodiment and the second embodiment for attaining the first object of the invention.
Figure 3:
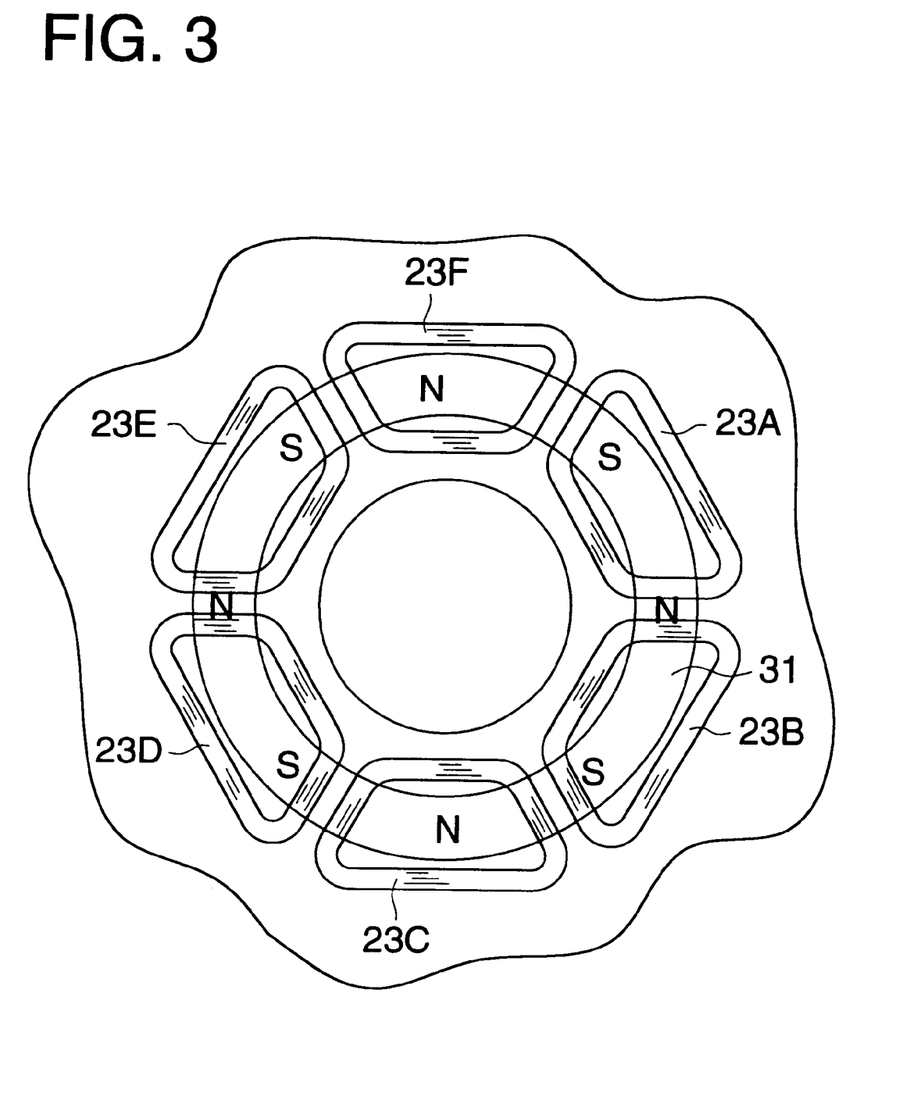
FIG. 3 is a diagram showing the positional relationship of coils and magnet in the optical deflection device shown in FIG. 2.

FIGS. 2 and 3 show an optical deflection device related to the present embodiment, and FIG. 2 is a sectional view of the optical deflection device, while, FIG. 3 is a diagram showing an arrangement of coils and magnet in the optical deflection device.

Laser beam L is reflected on rotary polygon mirror 30 and then is deflected by rotation of the rotary polygon mirror 30 within a range shown with directions L1 and L2 in FIG. 1. The rotary polygon mirror 30 is made of aluminum and is formed to be a hexagon each surface 301 of which is formed to be a mirror surface. The rotary supporting member 33 fixedly supports the rotary polygon mirror 30, magnet 31 and yoke 34. The rotary polygon mirror 30, the magnet 31 and the rotary supporting member 33 constitute rotary body R. The rotary supporting member 33 is rotatably supported by bearing unit 32. The bearing unit 32 is composed of thrust lower plate 35, thrust upper plate 37 and radial shaft 36. Between the rotary supporting member 33 and each of the thrust lower plate 35, the thrust upper plate 37 and the radial shaft 36, there is formed a delicate clearance which functions as an air bearing when the rotary supporting member 33 rotates. Namely, the bearing unit 32 is a dynamic pressure bearing device in which the rotary body R is supported by fluid pressure when it rotates at high speed.

The bearing unit 32 is fixed with screw 262 on base board 26 representing a fixedly supporting member which is fixed on bottom plate 40, and coil supporting board 22 representing a coil supporting member is fixed with screw 53 on the base board 26. On the coil supporting board 22, there is fixed coil 23. On the base board 26, there is provided recessed portion 51 in which yoke 52 is embedded. The coil 23, magnet 31, yoke 34 and yoke 52 form a magnetic circuit.

Positional relationship of magnet 31 and coils 23 is shown in FIG. 3. FIG. 3 is a diagram in which magnet 31 and coils 23 in FIG. 2 are viewed from the top, and the magnet 31 is ring-shaped, and it has magnetic poles in quantity of 4 pairs and 8 poles magnetized in the circumferential direction. The coils 23 include 6 coils 23A–23F which are arranged at regular intervals at positions each facing the magnet 31. When a phase-controlled pulse current is made to flow through the coils 23A–23F, torque is given to rotary body R, and the rotary body R is rotated.

The coil supporting board 22 is fixed on the base board 26 with adhesive agents. Adhesive agents constituting adhesive agent layer 50 are composed of elastic adhesives, and they constitute a buffer member. When the coil supporting board 22 is fixed on the base board 26 directly, without forming the adhesive agent layer 50, an electromagnetic noise is generated when the rotary body R rotates at high speed. This electromagnetic noise is estimated to be caused by vibration of the coil 23 generated when the pulse current is made to flow through the coil 23.

Due to the buffer action of the adhesive agent layer 50, the vibration is effectively prevented and thereby, generation of the noise is prevented. In particular, by providing a buffer member between base board 26 and coil supporting board 22 which supports coil 23, an effect of repression is high because a vibration is repressed at the source of generation of the vibration.

As the adhesive agent layer 50, elastic adhesive agent which is relatively soft when it is hardened is preferable, and examples of them include, for example, silicone type adhesive agents, epoxy type adhesive agents, and acrylic adhesive agents. Among them, the adhesive agent which is the softest in the hardened state is a silicone type adhesive agent, then comes an epoxy type adhesive agent and the next one is an acrylic adhesive agent. Softer adhesive agents tend to absorb vibrations in broader range of frequency, but it is necessary to study absorbing ability for vibration of noticeable frequency when selecting adhesive agents to be employed.

Silicone type adhesive agents include, for example, (1) Super X made by Cemedine Co., (2) KE44W made by Shin-etsu Silicone Co., and (3) 1230 made by Three-bond Co. Acrylic adhesive agents include, for example, (4) 366 (326 LVUV) made by Lock-tight Co., (5) 648 UV made by Lock-tight Co., (6) 334 made by Lock-tight Co., (7) 3851 made by Lock-tight Co. and (8) 3064 made by Three-bond Co. Epoxy type adhesive agents include, for example, (9) DP-190G made by Sumitomo 3M Co., (10) EP-001 made by Cemedine Co., (11) Araldite made by Ciba Geigy Co. and (12) 2204 made by Three-bond Co.

As a method to fix coil supporting board 22 on base board 26, when they are fixed by a fixing means such as a screw without using adhesive agents, or when an elastic member such as robber is inserted between the coil supporting board 22 and the base board 26, it is possible to prevent generation of the electromagnetic force noise. Elastic members include, for example, those made of urethane foam including (1) PORON made by IONAC CO. (2) Molto-plen made by IONAC CO., and (3) No. 5510 made by Sumitomo 3M Co.
(2) Embodiment 2

Figure 4:
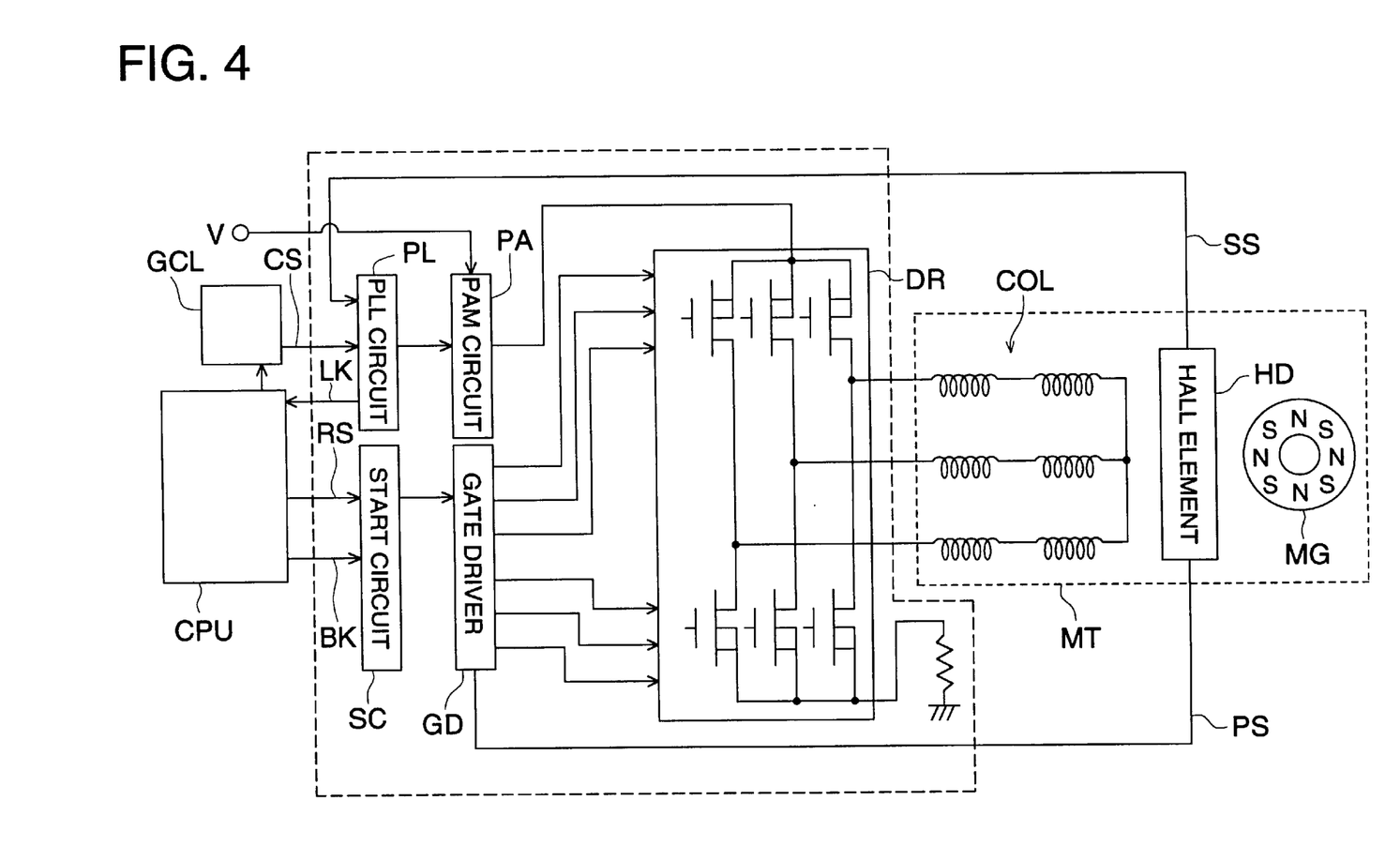
FIG. 4 is a block diagram of a circuit in the second embodiment of the invention.

Mechanical constitution of Embodiment 2 is shown in FIG. 1. Embodiment 2 is one related to the stop control for rotary polygon mirror 30 wherein the stop control to apply the brakes on rotary body R after lowering the number of rotations of rotary body R, when the rotation of rotary body R including rotary polygon mirror 30 is stopped, and FIG. 4 is a block diagram of the circuit in Embodiment 2. MT shown with dotted lines is a motor section including rotary polygon mirror 30, and DR is a driver circuit for driving motor section MT. The motor section MT is composed of six coils COL, magnet MG having 8 magnetic poles and of Hall element HD representing a detection means for the number of rotations. A driving circuit section shown with dotted lines is composed of PLL circuit PL, PAM circuit PA, start circuit SC, gate driver GD and driver circuit DR. GCL is a clock generating circuit representing a clock generating means. Driving pulses are supplied from driver circuit DR to coil COL (coil 23 in FIG. 2) of motor section MT, and rotation torque is given to magnet MG (magnet 31 in FIG. 1). Speed signals SS are outputted from the hall element HD, and based on the signals, there is applied phase-lock of PLL circuit PL. From PLL circuit PL, there are outputted lock signals LK in the case of phase-lock. From the Hall element HD, there are also outputted position signals PS which are used for phase control.

When rotation signal RS is turned on by CPU representing a control means, magnet MG starts rotating. When the number of rotations of the magnet MG reaches the rated number of rotations determined by reference clock CS from clock generating circuit GCL, phase-lock is conducted, and the magnet MG moves to steady rotation wherein it rotates at the constant speed. At the moment of reaching the steady rotation, lock signal LK is outputted from PLL circuit to CPU.

The control of rotation stop is started by turning off the rotation signal RS from CPU. When the rotation signal RS is turned off, driving force for rotation which drives motor section MT is stopped, and rotary body R including the magnet MG moves to the state of free run. After the prescribed lapse of time from the moment when rotation signal RS is turned off, brake signal BK is outputted from CPU. Due to the brake signal BK, coil COL is connected to the ground, then, regenerative brake is applied, and rotary body R including the magnet MG is stopped.

The free run time from turning off of rotation signal RS to output of brake signal BK is established to be the time for the number of rotations of rotary body R to go down from the rated number of rotations to the prescribed value. The preferable time is one required to go down to 80% of the rated number of rotations or less, and time which is especially preferable is one required to go down to 50% of the rated number of rotations or less. By outputting brake signal BK at the point of time when the number of rotations of rotary body R is lowered from its rated number of rotations as stated above, shocks given to rotary polygon mirror 30, magnet 31 and rotary supporting member 33 when they are stopped are lightened, and deviation of the rotary polygon mirror 30 is prevented accordingly. In addition, the period of time from the stop command which turns off rotation signal RS to the stop of rotary body R is greatly shortened.

The period of time from the stop of rotation signal RS which lowers the rated number of rotations from the prescribed value to the number of rotations to the output of brake signal BK can be obtained through experiments, and is set on the timer in CPU.

In the control to stop rotary polygon mirror 30, as another means to lower the number of rotations other than the foregoing, there is one to lower the number of rotations by the control of reference clock CS.

In this case, the control to stop is started not by turning the rotation signal RS off but by lowering the frequency of reference clock CS. Namely, the control to stop is started by lowering the frequency of reference clock CS from clock generating circuit GCL by means of the control of CPU. Due to the drop of the reference clock CS, the number of rotations of magnet MG is lowered, and when the frequency of speed signal SS which is lowered in accordance with the drop of the number of rotations of magnet MG agrees with that of the reference clock CS, lock signal LK is outputted to CPU from PLL circuit PL. Receiving the lock signal LK, the control means CPU turns off rotation signal RS and outputs brake signal BK which then stops rotary body R.

For the frequency of reference clock CS in the course of rated rotation, it is preferable that the frequency of reference clock CS in the case of the control to stop is established so that the number of rotations of rotary body R may be 80% or less of the rated number of rotations, and it is especially preferable to establish so that the number of rotations of rotary body R may be 50% or less of the rated number of rotations.
(3) Embodiment 3

Embodiment 3 relates to an image forming apparatus wherein the optical deflection device of the above-mentioned Embodiments 1 and 2 is incorporated in an exposure unit which conducts image writing. In the image forming apparatus, an image is formed on a recording sheet through an electrostatic latent image forming process wherein a laser is driven, a scanning beam is formed by the optical deflection device related to the Embodiment 1 or Embodiment 2, and a photoreceptor is subjected to scanning exposure to form thereon an electrostatic latent image in accordance with image data obtained through reading by an original reading unit or image data transmitted from external equipment, a developing process to form a toner image by developing the formed electrostatic latent image with a developing means, a transfer process to transfer the toner image from the photoreceptor onto a recording sheet, and a fixing process to fix the toner image on the recording sheet.

EXAMPLE (1) Example 1

Example 1 is an example in the Embodiment 1 stated above.

The optical deflection device shown in FIG. 1 wherein rotary polygon mirror 30 having 6 reflection surfaces, 6 coils 23, and magnet 31 having 8 magnetic poles are provided, was rotated at the speed of 33,000 rpm., and data shown in the following Table 1 and FIGS. 5 and 6 were obtained.

TABLE 1

|  | Without buffer member | Acrylic Lock-tight Co. 366 | Epoxy type Ciba Geigy Co. Araldite | Silicone type Cemedine Co. Super X | Silicone-gel sheet Sumitomo 3M Co. No. 5510 |
|---|---|---|---|---|---|
| Sound pressure lever (dB) caused by the number of mirror surfaces (3.3 kHz = Number of rotations (rotations/sec) × 6 surfaces) | 40.2 | 39.0 | 38.5 | 32.5 | 29.0 |
| Electromagnetic force noise (dB) under driven magnet coil (4.4 kHz = Number of rotations (rotations/sec) × 6 surfaces) | 33.0 | 14.5 | 13.6 | 8.5 | 6.5 |

Figure 5:
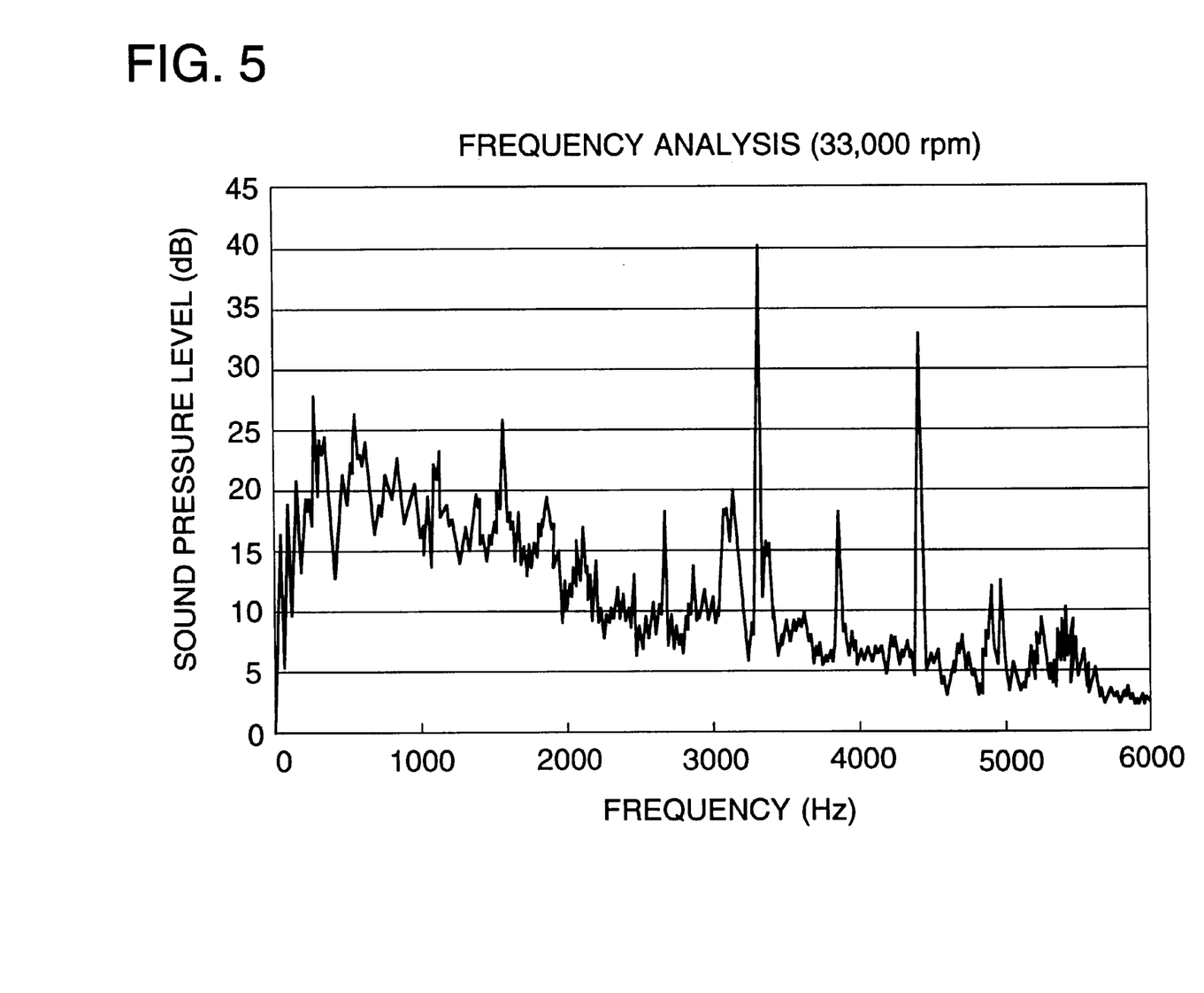
FIG. 5 is a graph showing the noise level shown in the case where no buffer member is provided.
Figure 6:
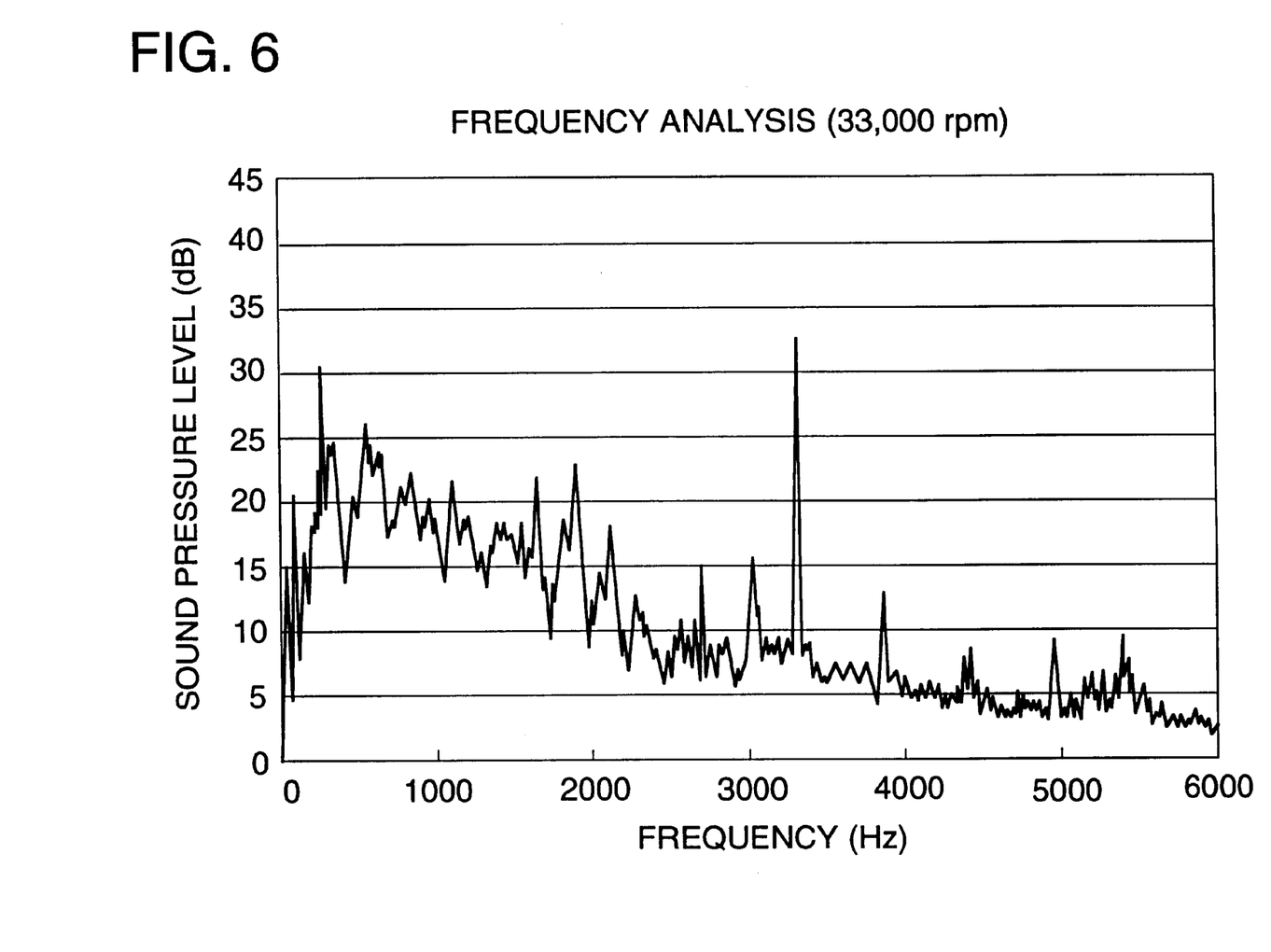
FIG. 6 is a graph showing the noise level shown in the case where Super X made by Cemedine Co. is used.

A noise level obtained through measurement about an optical deflection device wherein coil supporting board 22 is fixed directly on base board 26 without using any buffer member, is shown in FIG. 5, and the frequency where the noise level is especially high is 3.3 kHz and 4.4 kHz. The frequency 3.3 kHz is one caused by the number of mirror surfaces, and 4.4 kHz is the frequency caused by the moment when the magnet coil is driven. With regard to the noise level in each frequency where adhesive agents and elastic members are provided, data shown in Table 1 were obtained. Among these buffer members, those having high effect of noise prevention in particular are silicone type adhesive agents, Super X made by Cemedine Co. and silicone-gel sheet, No. 5510 made by Sumitomo 3M Co. Total noise level in the case of using Super X made by Cemedine Co. is shown in FIG. 6, and it was used as a buffer member in the optical deflection device in FIG. 1. The reason why Super X made by Cemedine Co. was used when the noise prevention effect of the silicone-gel sheet is higher than that of Super X made by Cemedine Co. is as follows. First of all, with regard to the nature of close contact between the coil supporting board 22 and base board 26, an adhesive agent is higher than an elastic member. Further, the coil supporting board 22 tends to have a change with passage of time, but it is possible to suppress a change with passage of time by sticking to the base board with adhesive agents, and thereby to secure the high nature of close contact for a long time. In the case of an elastic member, however, another means is necessary for suppressing a change with passage of time of the coil supporting board 22. Secondly, if an adhesive agent is used, it functions also as a fixing means to fix the coil supporting board 22 on the base board 26, but when an elastic member is used, a fixing means is needed separately. Thirdly, an adhesive agent makes it easier to assemble than an elastic member does. When an adhesive agent is used, it is coated on the base board 26 first, and then, the coil supporting board 22 is placed thereon to have only to be pressed for raising the nature of close contact. A screw may also be used for fixing on an auxiliary basis, and in either case, assembling is relatively easy. When an elastic member is used, on the other hand, it is necessary that the elastic member is placed on the base board 26, and the coil supporting board 22 is placed on the elastic member to be fixed with screws, while paying attention so that the elastic member may not be pulled or shifted partially. If the elastic member is pulled partially and is fixed as it is, another vibration is caused, which causes a possibility of generation of a noise. Further, some silicone-gel sheets are of double coated adhesive tape type for enhancing the nature of close contact, and in the case of a sheet of that kind, the sheet is accidentally folded and stuck when pasting, or the sheet can not be pasted on the correct position, and when trying to peel the sheet, it can not be peeled. Therefore, adhesive agents are better for assembly. Fourthly, an adhesive agent is lower than an elastic member such as a silicone-gel sheet in terms of cost.

(2) Example 2

Example 2 is an example wherein experiments were made by the use of the Embodiment 2 stated above. Results of the experiments are shown in Table 2.

TABLE 2

| A Period of time before applying brakes (Free run time) | B Number of rotations | C Motor vibration change (Acceleration) |
|---|---|---|
| 0 seconds | 43000 rpm | 0.3 m/S$^2$ |
| 2 seconds | 40000 rpm 93% | 0.2 m/S$^2$ |
| 5 seconds | 33000 rpm 77% | 0.1 m/S$^2$ No problem |
| 7 seconds | 30000 rpm 70% | 0.2 m/S$^2$ No probmen |
| 10 seconds | 25000 rpm 58% | Not more than 0.05 m/S$^2$ (No change) |
| 13 seconds | 20000 rpm 47% | Not more than 0.05 m/S$^2$ (No change) |

Rated number of rotations: 43000 rpm.
Initial vibration value = 0.8 m/S$^2$

After the rotation signal RS in FIG. 4 is turned off, signals BK were outputted after rotary body R was subjected to free run for the period of time shown in column A Table 2. As a result, the motor vibration change shown in column C which is a measured acceleration was great for number of rotations of 40,000 rpm. representing 93% of the rated number of rotations 43,000 rpm. shown in column B, while, the acceleration applied on the rotary body R showed a value within a range which is not a problem for the number of rotations of 33,000 rpm. representing 77% of the rated number of rotations. For 25,000 rpm. representing 58%, the acceleration was extremely small and no change was observed in vibration of the motor.

When the control for stopping shown in Table 2 was conducted, the rotary body R stopped within 20 seconds after the stop of rotation signal RS. However, when the rotary body R was stopped after free run, by turning off only rotation signal RS without applying brakes of brake signal BK, the required period of time from the stop of rotation signal RS to the stop of rotary body R was 1.5 minutes.

(3) Example 3

Example 3 is an example wherein experiments were made by the use of the Embodiment 2 stated above. Results of the experiments are shown in Table 3.

TABLE 3

| A<br>Number of<br>rotations | B<br>Motor vibration change<br>(Acceleration) |
| --- | --- |
| 43000 rpm | 0.3 m/S² |
| 40000 rpm | 0.2 m/S² |
| 35000 rpm | 0.10 m/S² No problem |
| 30000 rpm | 0.10 m/S² No probmen |
| 25000 rpm | Not more than 0.05 m/S² (No change) |
| 20000 rpm | Not more than 0.05 m/S² (No change) |
| 15000 rpm | Not more than 0.05 m/S² (No change) |

Rated number of rotations: 43,000 rpm.
Initial vibration value = 0.8 m/S²

In the control for stopping rotary polygon mirror 30, rotary body R was rotated by reference clock CS which gives the number of rotations shown in column A of Table 3, then, after lowering to that number of rotations, brake signal BK was supplied to stop the rotary body R.

As a result, the motor vibration change which was not a problem was observed at the number of rotations of 35,000 rpm., as shown in column B. In particular, the result was excellent at 30,000 rpm. or less.

Though the rotary body R stopped within 20 seconds after lowering of the reference clock due to the output of brake signal BK at low speed rotation shown in Table 3, the required period of time from the stop of rotation signals to the stop of rotary body R was about 1.5 minutes.

There was solved a problem that when a rotary polygon mirror rotating at high speed is stopped suddenly, shocks generated by the sudden stop cause phenomena that the rotary polygon mirror is deviated and balance is lost, resulting in unstable rotation and lowered efficiency of the motor, thereby, a highly durable optical deflection device which can stop in a short period of time and is excellent in high speed rotation efficiency, and an image forming apparatus have been realized.

In Embodiment 1–Embodiment 3, noises generated in the course of high speed rotation of a rotary polygon mirror, especially, electromagnetic force noises are effectively prevented.

Embodiments 1–3 of an optical deflection device for attaining the second object of the invention will be explained in detail as follows, referring to FIGS. 7–12.

Figure 7:
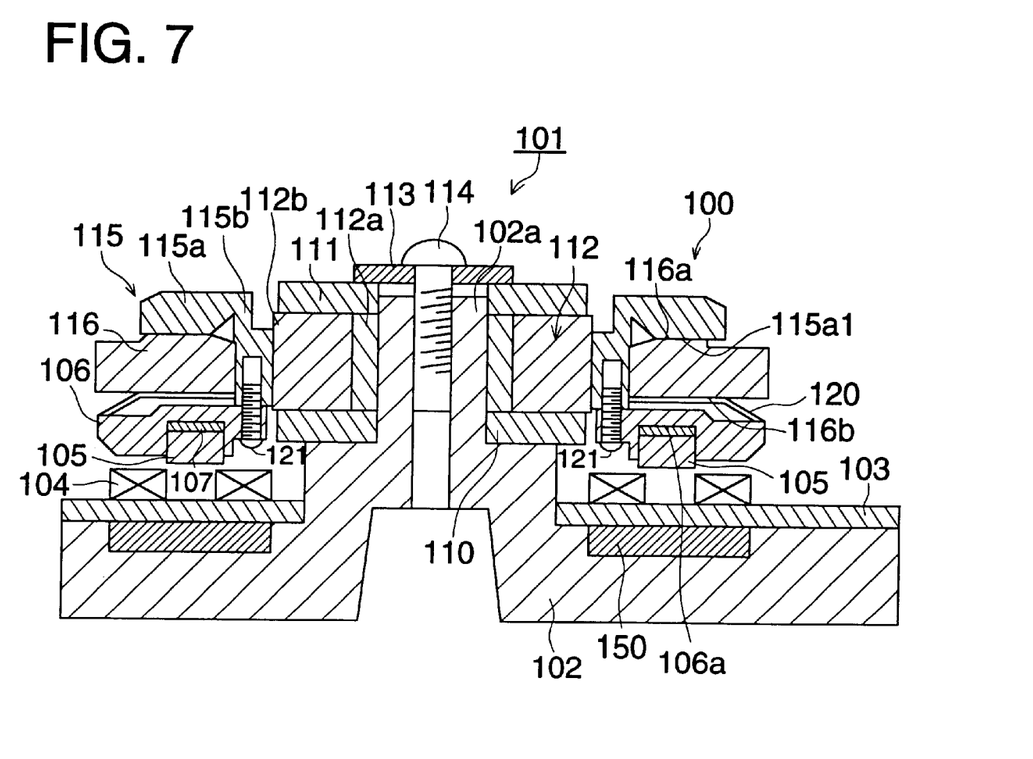
FIG. 7 is a sectional view of an optical deflection device.

FIG. 7 is a sectional view of the optical deflection device. Optical deflection device 101 in the present embodiment is one which is incorporated in a beam scanning optical unit shown in FIG. 12, for example, and deflects a laser beam through rotation of polygon mirror 116, and it is fixed on the side of an apparatus by means of base board 102.

Flange 115 is made of aluminum or steel, and on the end portion of cylinder portion 115b, there is provided disk-shaped disk portion 115a. On the bottom surface (opposite to the end portion of the cylinder portion 115b where the disk portion 115a is provided) of the disk portion 115a, there is provided reference surface 115a1 for mounting a mirror, then, end face 116a of polygon mirror 116 is brought into contact with the reference surface 115a1, and buffer member 120 is inserted in the clearance with mirror holding plate 106 to be incorporated so that they may be rotated solidly. The cylinder portion 115b of the flange 115 is fitted in outer casing bearing 112b through a method of shrinkage fitting to be unified, thus, mirror unit 100 is formed.

The mirror unit 100 is mounted on shaft portion 102a of base plate 102 through lower thrust bearing 110, upper thrust bearing 111 and inner cylindrical bearing 112a, to be regulated by screw 114 which is turned in the shaft portion 102a through plate 113.

On the base plate, there is provided fixed yoke 150 and is further provided print base board 103 on which magnet coil 104 is mounted. Permanent magnet 105 for generating torque is arranged to face the magnet coil 104, and the permanent magnet 105 is provided on recessed portion 106a formed on mirror holding plate 106, through adhesive agents.

Rotary shaft 112 is composed of inner cylindrical bearing 112a and outer casing bearing 112b, wherein the outer casing bearing 112b can rotate on the inner cylindrical bearing 112a, and flange 115 is fitted with the outer casing bearing 112b through cylinder portion 115b. Incidentally, in the present embodiment, the bearing structure is a dynamic pressure bearing structure composed of lower thrust bearing 110, upper thrust bearing 111, inner cylindrical bearing 112a and outer casing bearing 112b, and a dynamic pressure generating groove is provided on both of or on either one of the lower thrust bearing surface and the outer circumferential surface of the inner cylindrical bearing 112a.

It is so structured that the cylinder portion 115b of the flange 115 is fitted with the outer casing bearing 112b of the rotary shaft 112 to improve the fitting strength, and the outer circumference of the cylinder portion 115b is made to be the reference for mounting the rotation central shaft of polygon mirror 116 to improve accuracy of the shaft center of polygon mirror 116.

Preferable fitting between the cylinder portion 115b of the flange 115 and the outer casing bearing 112b of the rotary shaft 112 is shrinkage fitting, but the fitting by other press fitting means is also acceptable.

In manufacturing, the reference surface 115a1 for mounting polygon mirror 116 on disk portion 115a is machined after the flange 115 is fitted with outer casing bearing 112b, and the polygon mirror 116 is mounted on the cylinder portion 115b of the flange 115 in a way that end face 116a of the polygon mirror 116 is brought into contact with the reference surface 115a1.

Elastic member 120 such as a leaf spring is made to exist between the other end face 116b of the polygon mirror 116 and mirror holding plate 106, and an end face of cylinder portion 115b of the flange 115 and the mirror holding plate 106 are fixed by fixing member 121 such as a screw, thus, holding force of the elastic member 120 to hold the polygon mirror 116 is stabilized, and mirror fixing can be conducted without distorting the polygon mirror 116.

An optical deflection device to attain the third object of the invention is one wherein no tapered distortion is generated on cylinder-shaped outer casing bearing 112b which is in the relation of fitting with cylinder portion 115b of flange 115 despite ambient temperature rise in operation, and operating characteristics are not varied so that reliability is enhanced. It will be explained in detail as follows, referring to the following embodiments.

(Embodiment 1)

Embodiment 1 will be explained as follows, referring to a sectional view of the fitting section of cylinder portion 115b of flange 115 and outer casing bearing 112b shown in FIG. 8.

Figure 8:
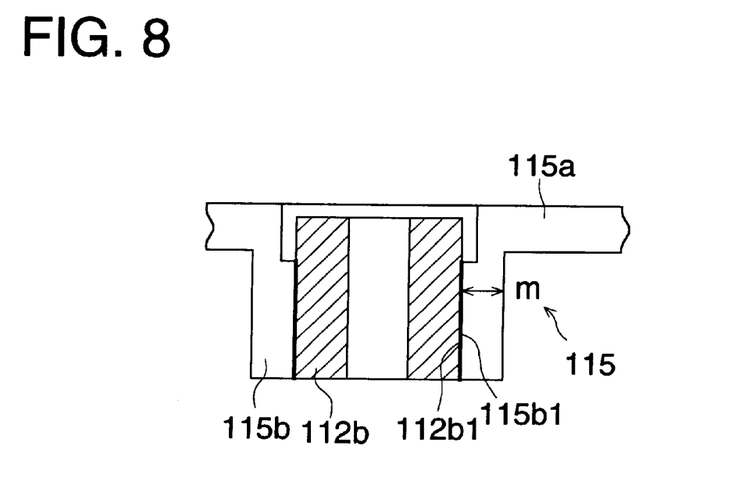
FIG. 8 is an illustration showing the state of joining in the first embodiment for attaining the second object.
Figure 11:
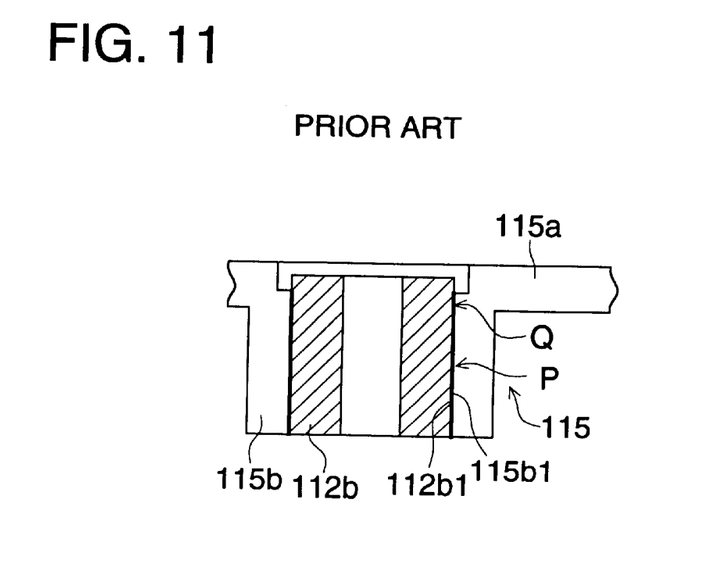
FIG. 11 is an illustration showing the conventional state of joining.

FIG. 11 shows how the conventional fitting section is structured, and FIG. 8 shows how the fitting section of the present embodiment is structured. Cylinder portion 115b of flange 115 made of aluminum or steel is fitted with cylinder-shaped outer casing bearing 112b made of ceramic or of surface-treated aluminum through shrinkage fitting or press fitting to be unified.

However, in the case of the fitting means such as shrinkage fitting, stresses to push each other exist on the contact surfaces 112b1 and 115b1 at the fitting section. Further, outer casing bearing 112b is different from flange 115 in terms of material, and they are also different from each other in terms of expansion coefficient. In the case of temperature rise in operation, therefore, internal stress is also varied. When the internal stress varies uniformly at contact surfaces 112b1 and 115b1, there is no problem. However, when local difference of stress is caused, distortion is generated on the shape of outer casing bearing 112b. The wall thickness of flange 115 at the point shown with P and that at the point shown with Q at the contact surfaces 112b1 and 115b1 in FIG. 11 showing the conventional state are different each other, and therefore, the outer casing bearing 112b in the form of a cylinder is changed to that in the form of a cone, and there is a fear that flange 115 is deviated in the axial direction and rotation operation of polygon mirror 116 becomes unstable.

The invention has been achieved by finding that unstable rotation operation of polygon mirror 116 in the prior art was caused by the shapes and structures shown in FIG. 11, and the fitting section of flange 115 which fits with an outside diameter portion of outer casing bearing 112b is made to be cylinder portion 115b having the uniform wall thickness m in the direction perpendicular to rotation central axis of cylinder portion 115b as shown in FIG. 8. Due to this structure, no abnormal distortion is generated on the outer casing bearing 112b despite fluctuation of ambient temperature, and thereby, polygon mirror 116 can continue stable rotation operation.

In the embodiment stated above, a mirror holding plate is fixed on an end face of a cylinder portion with a screw member. Therefore, screw holes are provided on the cylinder portion having the uniform wall thickness, and grooves reaching the screw holes are provided. However, they have no influence, and the wall thickness can be considered to be uniform.

Figure 9:
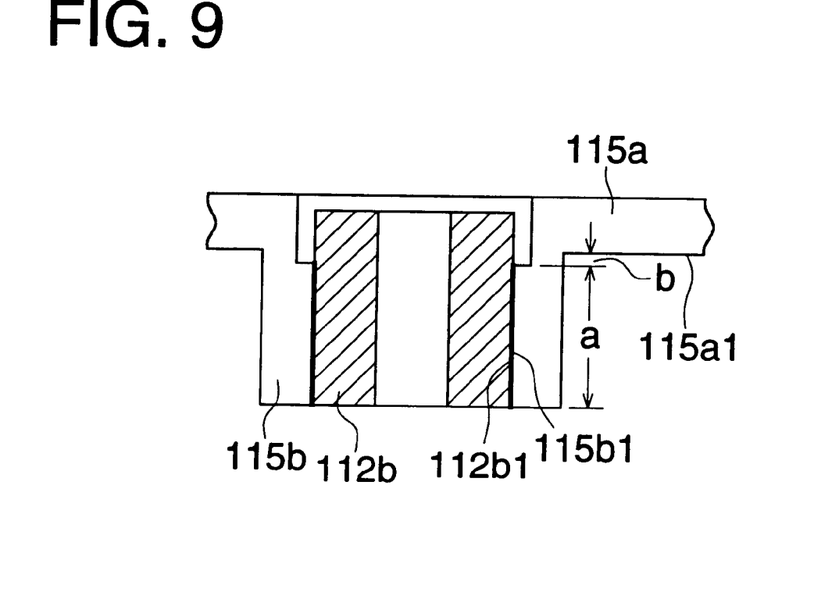
FIG. 9 is an illustration showing the state of joining in the second embodiment.

Embodiment 2 will be explained as follows, referring to the sectional view of the fitting section between cylinder portion 115b of flange 115 and outer casing bearing 112b shown in FIG. 9. As shown in FIG. 9, the present embodiment is structured so that mirror-mounting reference plane 115a1 on disk portion 115a of flange 115 is away toward the outside in the rotation central axis direction by "b" (b>0) from the fitting section between cylinder portion 115b and outer casing bearing 112b having a range "a" in the axial direction. Due to this structure, no abnormal distortion is generated on the outer casing bearing 112b despite fluctuations of ambient temperature, and thereby, polygon mirror 116 has come to be capable of continuing stable rotation operations. It is naturally preferable in the present embodiment that wall thickness m on the cylinder portion is uniform as in the first embodiment.

(Embodiment 3)

Figure 10:
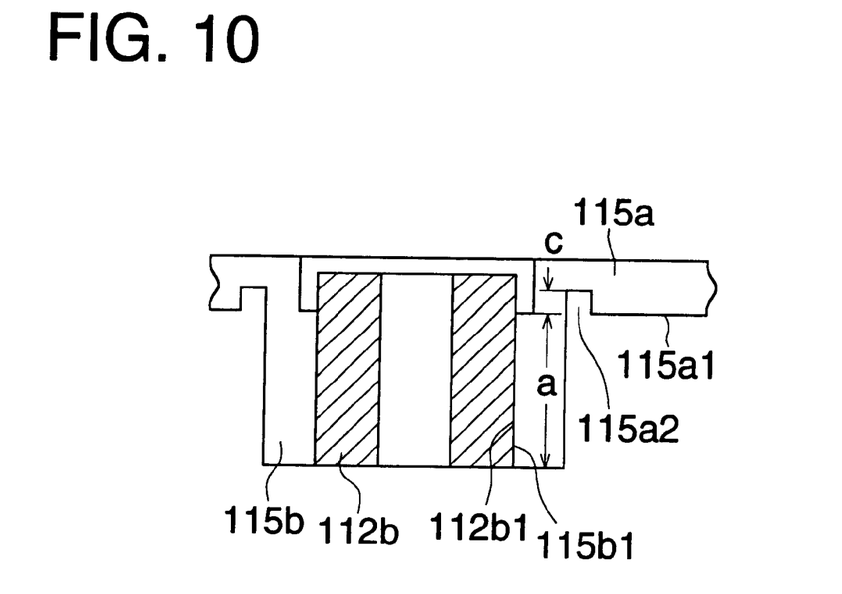
FIG. 10 is an illustration showing the state of joining in the third embodiment.

Embodiment 3 will be explained as follows, referring to the sectional view of the fitting section between cylinder portion 115b of flange 115 and outer casing bearing 112b shown in FIG. 10. As shown in FIG. 10, the present embodiment is structured so that ring-shaped groove section 115a2 is provided on the side of mirror-mounting reference plane 115a1 between cylinder portion 115b of flange 115 and disk portion 115a, and the bottom surface of the groove section 115a2 is away toward the outside in the rotation central axis direction by "c" (c>0) from the fitting section between cylinder portion 115b and outer casing bearing 112b having a range "a". Due to this structure, no abnormal distortion is generated on the outer casing bearing 112b despite fluctuations of ambient temperature, and thereby, polygon mirror 116 has come to be capable of continuing stable rotation operations. It is naturally preferable in the present embodiment that wall thickness m on the cylinder portion is uniform as in the first embodiment.

Due to Embodiments 1–3, optical deflection characteristics of a polygon mirror rotating at high speed tending to be varied by fluctuations of ambient temperature have been improved, and a polygon mirror has become to be capable of continuing reliable and stable rotation operations.

Embodiments 1–3 of the optical deflection device for attaining the third and fourth objects of the invention will be explained as follows, referring mainly to FIGS. 13–15(b).

The optical deflection device to attain the third and fourth objects of the invention is one wherein cylinder portion 115b of flange 115 and cylinder-shaped outer casing bearing 112b are fitted to be free from surface inclination and eccentricity, and distortion in terms of shape caused by ambient temperature rise in the course of operation is prevented, thus, deviation between the cylinder portion 115b and the outer casing bearing 112b in the axial direction is prevented, and operation characteristics are not varied. The optical deflection device will be explained in detail as follows, referring to embodiments.

(Embodiment 1)

Figure 13:
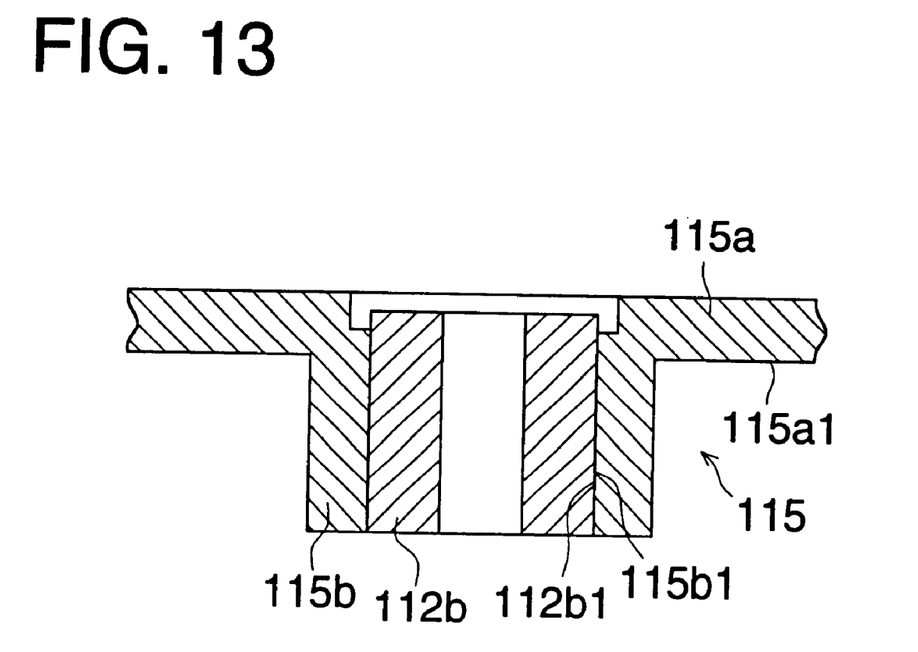
FIG. 13 is an illustration showing the state of joining in the first embodiment for attaining the third and fourth objects.

Embodiment 1 will be explained as follows, referring to the sectional view of the fitting section between cylinder portion 115b of flange 115 and outer casing bearing 112b shown in FIG. 13.

Cylinder portion 115b of flange 115 made of aluminum or steel is fitted with cylinder-shaped outer casing bearing 112b made of ceramic or of surface-treated aluminum through shrinkage fitting or press fitting to be unified.

Namely, an inner surface of cylinder portion 115b of flange 115 is machined by a precision lathe to be hollow cylindrical surface 115b1 which is smaller in terms of diameter than cylindrical surface 112b1 of outer casing bearing 112b by the so-called interference. The flange 115 whose hollow cylindrical surface 115b1 has been machined is subjected to high temperature heating to be at high temperature suitable for shrinkage fitting, and then, it is fitted with the outer casing bearing 112b which is at room temperature. The diameter of the hollow cylindrical surface 115b1 of the flange 115 extended by high temperature through thermal expansion to be greater than that in the process of machining shrinks as the temperature goes down, thus, an amount of the interference stated above is turned into strain which generates stresses pushing one another on the contact surface between the inner surface of the cylinder portion 115b and an outer circumferential surface of the outer casing bearing 112b to create the state of fitting between both.

Since each of the cylindrical surface 112b1 of outer casing bearing 112b and the hollow cylindrical surface 115b1 of cylinder portion 115b is formed to be free from eccentricity to its own axial center and to be in parallel with its own axial center, the flange united solidly by shrink fitting is free from surface inclination and eccentricity, thus, polygon mirror 116 mounted with a reference of reference surface 115a1 on disk portion 115a of flange 115 for mirror mounting can be rotated at high speed under the condition of neither surface inclination nor eccentricity.

In the present embodiment, shrinkage fitting is a preferable fitting method for fitting outer casing bearing 112b in flange 115, but the invention is not limited to this, and the same effect as in the shrinkage fitting can be obtained by a fitting method wherein a means such as press fitting creates the state of pressure contact through internal stress.
(Embodiment 2)

The technical means to fit and unite outer casing bearing 112b with cylinder portion 115b of flange 115 through a pressure contact means such as shrinkage fitting explained in Embodiment 1 is extremely effective for polygon mirror 116 to be free from surface inclination and eccentricity when it rotates at high speed. However, the inventors of the invention found that when there is used a technical means wherein the state of fitting is kept by internal stress when the optical deflection device is subjected to fluctuations of preservation temperature or to temperature fluctuations caused by continued use for a long time, stresses are also varied because outer casing bearing 112b is different from flange 115 in terms of coefficient of thermal expansion, and thereby, the outer casing bearing 112b and flange 115 are feared to mutually deviate slightly in the axial direction.

Figure 14:
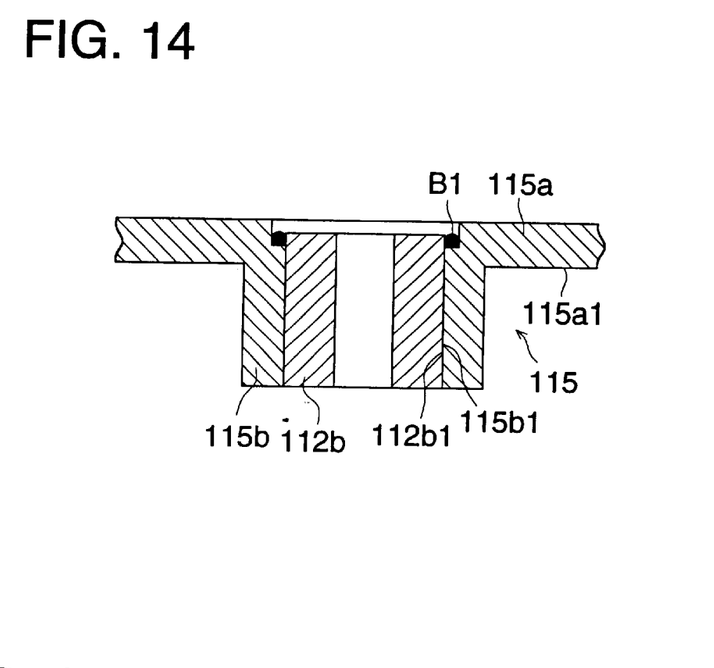
FIG. 14 is an illustration showing the state of joining in the second embodiment.
Figure 15:
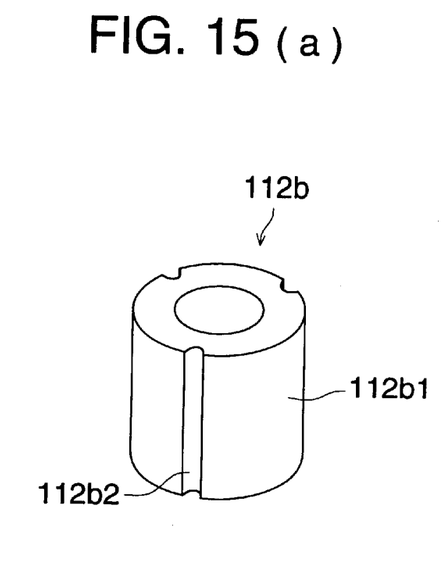
FIGS. 15(a) and 15(b) represent an illustration showing the state of joining in the third embodiment.

Embodiment 2 is one wherein no deviation in the axial direction is generated between outer casing bearing 112b and flange 115 despite temperature fluctuations, which will be explained based on the sectional view of the fitting section between cylinder portion 115b of flange 115 and outer casing bearing 112b shown in FIG. 14.

After cylindrical surface 112b1 of cylinder-shaped outer casing bearing 112b made of ceramic or surface-treated aluminum is fitted to be united with hollow cylindrical surface 115b1 provided on cylinder portion 115b of flange 115 made of aluminum or steel by a pressure contact means such as shrinkage fitting explained in Embodiment 1, adhesive agents are coated and solidified on the entire circumference as shown with B1 so that outer casing bearing 112b and cylinder portion 115b of flange 115 may be connected to the point corresponding to the end portion of the fitting section. As adhesive agents, there are given acrylic adhesive agents and epoxy type adhesive agents, and acrylic UV-setting resin is preferably used. Coating of the adhesive agents mentioned above prevents effectively the deviation in the axial direction generated when temperature varies between outer casing bearing 112b and cylinder portion 115b which are under the state of pressure contact, thus, polygon mirror 116 can rotate at high speed stably with neither face blurring nor axial slip despite fluctuations of ambient temperature.

Embodiment 3 is one wherein no deviation in the axial direction is generated between outer casing bearing 112b and flange 115 despite temperature fluctuations, and FIG. 15(a) is a perspective view showing how groove section 112b2 for injecting adhesive agents is provided on cylindrical surface 112b1 of outer casing bearing 112b, while, FIG. 15(b) shows a sectional view of the fitting section between cylinder portion 115b of flange 115 and outer casing bearing 112b.

Cylindrical surface 112b1 of cylinder-shaped outer casing bearing 112b made of ceramic or surface-treated aluminum is fitted to be united with hollow cylindrical surface 115b1 provided on cylinder portion 115b of flange 115 made of aluminum or steel by a pressure contact means such as shrinkage fitting explained in Embodiment 1. On the cylindrical surface 112b1 of outer casing bearing 112b in the present embodiment, there are uniformly provided three groove sections 112b2 to be in parallel with the axis, and adhesive agents are injected in groove sections 112b2 in the state of B2 between outer casing bearing 112b and cylinder portion 115b of flange 115 which are under the state of fitting, and when the adhesive agents are solidified, the fitting is strengthened and mutual deviation in the axial direction is prevented despite temperature fluctuations.

As adhesive agents, there are given acrylic adhesive agents and epoxy type adhesive agents, and acrylic UV-setting resin is preferably used, and it is injected in groove section 112b2 and is subjected to irradiation of UV rays from an injection inlet to be solidified. Incidentally, in the present embodiment, though the groove section 112b2 is provided on the cylindrical surface 112b1 of outer casing bearing 112b, the invention is not limited to this, and the same effect can be obtained also by injecting and solidifying adhesive agents in the groove sections which are uniformly provided on hollow cylindrical surface 115b1 of cylinder portion 115b to be in parallel with the axis, thus, polygon mirror 116 can rotate at high speed stably with neither face blurring nor axial slip despite fluctuations of ambient temperature.

Due to Embodiment 1, the axial center of an outer casing bearing and that of a flange agree completely, and thereby, a polygon mirror can be free from eccentricity and inclined angle to rotate. Due to Embodiment 2 or Embodiment 3, even when preservation temperature varies and ambient conditions are changed, no influences of them are given, and reliability is further improved, thus, a polygon mirror can be free from eccentricity and inclined angle to continue its stable rotation.

What is claimed is:

1. An optical deflection device comprising:

(a) a fixed supporting member;

(b) a coil supporting member fixed on the fixed supporting member;

(c) a coil fixed on the coil supporting member;

(d) a rotary body having a rotary polygon mirror, a magnet facing and apart from the coil and a rotary supporting member for supporting the rotary polygon mirror and the magnet;

(e) a bearing unit supported on the fixed supporting member for rotatably supporting the rotary body; and (f) a buffer member interposed between the fixed supporting member and the coil supporting member.

2. The optical deflection device of claim 1, wherein the buffer member is an elastic adhesive agent.

3. The optical deflection device of claim 1, wherein the buffer member is a silicon adhesive agent, an epoxy adhesive agent or an acrylic adhesive agent.

4. The optical deflection device of claim 1 further comprising a fixing means for fixing the coil supporting member to the fixed supporting member through the buffer member.

5. The optical deflection device of claim 1, wherein the bearing unit is a dynamic,bearing unit.

6. An image forming apparatus comprising:

an optical deflection device comprising:

(a) a fixed supporting member;

(b) a coil supporting member fixed on the fixed supporting member;

(c) a coil fixed on the coil supporting member;

(d) a rotary body having a rotary polygon mirror, a magnet facing and apart from the coil and a supporting member for supporting the rotary polygon mirror and the magnet;

(e) a bearing unit supported on the fixed supporting member for rotatably supporting the rotary body; and (f) a buffer member interposed between the fixed supporting member and the coil supporting member.

* * * * *